Nov. 23, 1937. J. J. STEPHENS 2,100,206
DIFFERENTIALLY OPERATED DETECTION CIRCUIT
Filed Aug. 4, 1934
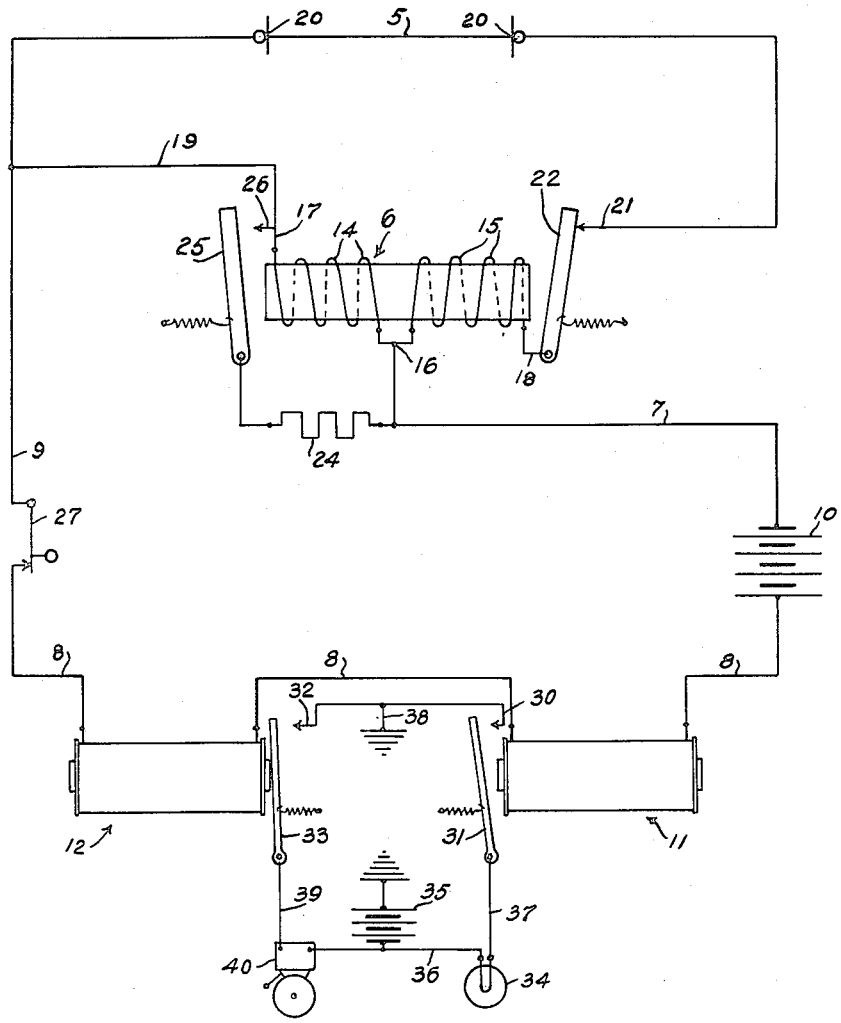
INVENTOR.
John J. Stephens;
BY
Harold D. Penney, ATTORNEY.

UNITED STATES PATENT OFFICE 2,100,206

DIFFERENTIALLY OPERATED DETECTION CIRCUIT

John J. Stephens, Brooklyn, N. Y., assignor to American District Telegraph Company, Jersey City, N. J., a corporation of New Jersey Application August 4, 1934, Serial No. 738,481

7 Claims. (Cl. 177—311)

This invention relates to signal systems, particularly to micro-phonic sound or vibration detection systems and more particularly to sound or vibration detection systems used for burglar alarms and other protective purposes.

An object of the invention is to provide a new and improved detection system which requires a minimum of operating current and equipment and is reliable under all conditions likely to be encountered in service.

The operation of practically all sound and vibration detection systems used for protective purposes depends upon a change in the current values in the circuit, brought about by a variation of the resistance of the circuit, which in turn is caused by a change in the resistance of the detecting units. By employing a normally energized relay in the detector circuit, an increase in detector resistance is easily converted to actuate signal-responsive devices. Experience has shown, however, that a decrease in detector circuit resistance is more difficult to detect, and that its conversion to actuate signal-responsive devices necessitates close adjustment of associated relays. It has been found, further, that other factors, not normally encountered in the operation of the system, may, under certain circumstances, cause the transmission of signals which are identical with those occurring in normal operation of the system and are therefore likely to be misleading. The order of current value normally used, also, generally requires the use of current amplifiers or the introduction in the circuit of sensitive relays requiring close and accurate adjustment. It is therefore obvious that such a system requires frequent attention and adjustment, and that it is frequently affected by natural causes, such as slight changes in temperature, circuit resistance, or humidity.

In accordance with certain features of the present invention, means are provided whereby a system may be operated practically without supervision and independently of minor changes in current and resistance. Means are also provided whereby signals originating in the detector portion of the circuit will persist despite the cessation of the factor or factors causing them. To accomplish this result in the preferred form of the invention, means are provided for open-circuiting of the portion containing the detectors once they are operated.

Briefly stated, the system comprises a normally closed circuit having a detector portion and an indicating portion, a differential relay arrangement including a normally neutral magnet having two windings, one of them being in the detector portion, the other being in shunt around the detector portion. The detector portion of the circuit includes a switch normally biased to closed circuit position and openable by the magnet when unbalanced to open the detector portion of the circuit.

A second switch baised to open position closes a comparatively low resistance shunt around the magnet winding in the circuit which is in shunt to the detector portion. The indicating portion of the circuit includes, in series, the coils of the signal operating means, and the current source.

Means operated by the relay when unbalanced opens the detector circuit thereby further unbalancing the relay and decreasing the current in the supply and indicating circuit; while other means operated by the relay subsequently increases the current in the supply and indicating circuit. The increase and/or decrease of current in this circuit operates signal means.

Other features and advantages of the invention will appear from a consideration of the following description taken in connection with the accompanying drawing, which illustrates diagrammatically a circuit embodying the features of the invention.

The supply and indicating circuit includes a current source 10, an excess-current-operated signal means 11, an under-normal-current operated signal means 12, and a manually operable switch 27, interposed in series in the indicating circuit, the elements noted being joined by wiring 8 and 9, detector loop 5, microphonic detectors 20—20, wiring 21, armature switch 22, wiring 18, coil 15 and wiring 7.

There is a closed shunt including winding 14 of the differential relay and connecting conductor 19, said wiring being continued from a tap or point 16. It will be noted that the current passes from the supply source 10 to said point 16, by means of circuit leg 7, and branches to and through the detecting loop and shunt from this point, returning to the source 10 through detecting circuit leg 9. The windings 14 and 15 of the differential relay 6 are oppositely wound and normally energized, and are adapted normally to neutralize each other. A normally open shunt 24, 25, 26, is adapted to be connected around the coil 14 and includes in series, a shunt resistance 24, a normally open, locking-in relay armature switch 25, 26 adapted to be closed by said magnet when unbalanced, thereby shunting the resistance 24 into parallelism with the winding 14.

The electrical resistances of the detector portion including the wiring 5, and the shunt connections 14, 17 and 19 are approximately equal and the current from the main source 10 normally divides approximately equally between said detector portion and the shunt connections. An increase in the resistance of the detector network portion 5 due to microphonic action of the detectors 20—20 decreases the current flow in said portion, unbalances the differential relay and permits the relay to operate. When operating the relay, the relay switch 21, 22, is first opened which eliminates all current flow in the detector loop 5. The current flowing in the circuit at this time is only that which flows in said shunt connections and the indicating portion circuit 14, 19 and this current operates the under-normal-current operated coil 12.

The relay-operated switch 25, 26 then closes and establishes a shunt circuit around winding 14, through the shunt resistance 24. The conductivity of said shunt resistance 24 is sufficient to allow the passage of enough current, in addition to that which will flow in winding 14, to cause operation of the excess-current signal means 11. Since the winding 14 only receives current the relay-operated switches 21, 22 and 25, 26 remain operated until the current flow in the winding 14 is interrupted, to restore switch 21—22, as by a switch 27, deenergizing the relay and reclosing the switch 21, 22 in the detector network and opening the switch 25, 26 in the resistance shunt circuit.

The normal circuit may be traced from the battery 10, through the relays or signal means 11, 12, conductors 8, 9, the detectors 20, and the detector wiring 5, the detector circuit deenergizing contact 21 and armature 22 of the relay 6, winding 15 of the relay 6 and conductor 7, to the battery 10. The normally energized shunt to the detector circuit portion 5 may be traced from conductors 9, 19 through winding 14 of relay 6, conductor 7 to the battery 10. In this system, the relay 6 is not affected by any change in voltage, resistance, or current in the indicating portion 7, 8, 9, and therefore it can be adjusted to practically any degree of sensitivity without difficulty.

One important feature of this system is that the current passing through either winding 14 or 15 would normally be enough to operate the relay if that winding were not opposed by the other winding. Thus, the relay will be sure to operate when the detector portion which includes the wiring 5 is open-circuited.

Alternatively, the system can also be considered as having a normally closed indicating circuit portion and a normally closed detector circuit portion, supervised by a single source, the differential relay 6 being connected as already described, whereby current resistance changes in the detector circuit unbalances the differential relay. Thereafter the unbalanced differential relay, when unbalanced by the action of the detector circuit, operates means to open the detector circuit, thereby to further unbalance the differential relay, which then causes other means to increase the current in the indicating circuit thereby to operate a signal upon such increase of current in the indicating circuit.

Upon the operation of the relay 6 in accordance with a feature of the invention, the armature 25 is attracted to close a shunt circuit 24, 25, 26 around the relay winding 14, which shunt may be traced from conductors 9, 19, through the energized contact 26, armature 25, and resistance 24. Simultaneously, with the attraction of the armature 25, the armature 22 is attracted and the detector network 5 is open circuited at deenergized contact 21 and armature 22. Since the current flowing through winding 14 of relay 6 has not been interrupted, the relay armature 25 will remain attracted. The reduction in current resulting when the detector portion 5 is open-circuited, and the subsequent increase in current resulting when armature 25 closes on contact 26, will be sufficient to operate the signal-responsive means 11. Furthermore, the current flowing through winding 14 will hold the current flow in the circuit at an increased value indefinitely, since the relay 6 will remain operated until the circuit is again broken as by the switch 27 between the relay 6 and the source of current 10 or by otherwise resetting the switches controlled by 6.

The signal-operating means comprises two relays 11 and 12. Relay 11 is provided with signal contact 30 and armature 31, and relay 12 is provided with signal contact 32 and armature 33. In the preferred embodiment of the system, the armature 33 will close on contact 32 when the current in relay 12 is reduced below a predetermined point, as will be the case when the detector portion 5 of the circuit is opened, or when the resistance therein increases perceptibly. Similarly, armature 31 will close on signal contact 30 when the current flow in relay 11 increases appreciably, as will result when armature 25 of relay 6 closes the shunt circuit through the resistor 24. The engagement of armature 31 with contact 30 will serve to operate visual signal 34, by current passing from grounded local source 35, through conductors 36, 37, armature 31, contact 30 to ground 38; while engagement of armature 33 on contact 32 will cause current to pass from source 35, conductors 36, 39, armature 33, contact 32 to ground 38, thus operating the audible signal 40.

It will be evident from the above description that the open-circuiting of the detector portion 5 will result in momentary operation of the audible signal 40, the armature 33 being attracted by the magnet 12 after attraction of the armature 22, and before operation of the armature 25 and persisting operation of the visual signal 34, the armature 31 and contact 30 being then engaged; while an open circuit in network 7, 8, 9, will result in the operation of the audible signal 40 only. A transient short-circuit between conductors 9 and 7 will result in the operation of visual signal 34, persisting, however, only so long as the short circuit persists. It will be evident further that these signals are thus distinctive, and also that any current or resistance changes in the circuit 7, 8, 9 will not affect its functioning provided, of course, the current value is maintained above the minimum required for preventing such short circuiting.

The invention claimed is:

1. An alarm system comprising a normally closed electric circuit having a detector portion, an indicating portion and circuit energizing means; a differential normally neutral magnet having a winding in the detector portion and a winding in shunt around the detector portion, said latter portion having a switch normally biased to closed circuit position; a second switch biased to open position and disposed in shunt around the first shunt winding, said second switch being operable by the magnet responsive to vibration in the detector portion whereby to open the first switch for changing the current flow in said indicating portion; and signal means associated with said indicating portion for operation thereby upon the current change.

2. An alarm system comprising a normally closed circuit including a source of current and having a loop portion including a detector, and an indicating portion having therein undercurrent operated means; signal means associated with the first means; a differential magnet having a winding in the loop and a winding connected in shunt to the loop, the windings being arranged to normally neutralize each other, whereby a change of current in the detector and loop may unbalance the differential magnet; and means operative by said magnet when unbalanced to open the loop portion of the circuit and change the current flow in the indicating portion, the change being such as to vary the current flow in the first mentioned means whereby to operate said signal means.

3. An alarm system comprising a normally closed electric circuit including a source of current and having a portion including a detector, an indicating portion having therein an under current operated magnet; signal means associated with the magnet; a differential magnet having a winding in the detector portion and a winding extending in shunt from the first winding and being connected with the wiring which connects said portions, said windings being arranged to normally neutralize each other; whereby a change of resistance in the detector may unbalance the differential magnet, and means cooperating with said magnet and operable thereby when unbalanced for opening the first mentioned portion so as to increase the current flow in the indicating portion, whereby the increased current may cause the first mentioned magnet to operate said signal means.

4. An alarm system comprising a normally closed energized electric circuit including a detector portion and an indicating portion, the latter having therein excess current actuated signal operating means and under current signal operating means; a signal circuit cooperating with said means; a differential normally neutral magnet having a winding in the detector portion and a winding in shunt around the first portion, the windings being arranged to normally neutralize each other, whereby a resistance change in the detector portion may unbalance the differential magnet; means operated by the magnet when unbalanced for opening the first mentioned portion to change the current flow so as to operate the signal circuit through said under current means, and means operated by said magnet when unbalanced sufficiently to change the current flow so as to operate the signal circuit through said excess current means.

5. An alarm system comprising a normally closed main electric circuit including a source of current and having a portion including a microphone detector and an indicating portion; a differential normally neutral magnet having a winding in the detector portion and a winding in shunt around said detector portion, there being a center tap connecting the windings in the circuit; the detector winding having associated therewith a switch normally biased to closed circuit position, a second switch associated with the shunt winding and normally biased to open position, whereby a resistance change in the detector may unbalance the magnet and change the current flow in the indicating portion; an excess current signal controlling relay and an undercurrent signal controlling relay in said indicating portion; a second circuit including signal means, said latter circuit being normally open, and means actuated by said relays for closing the second circuit whereby to operate said signal means when the current flow is changed.

6. An alarm system comprising a normally closed main electric circuit having a portion including a detector, an indicating portion and circuit energizing means; a differential normally neutral magnet having a winding in the detector portion and a winding in shunt around said detector portion, said detector portion having a switch normally biased to closed circuit position; a second switch biased to open circuit position, said latter switch having a resistance connected therewith and forming a shunt around the shunt winding, whereby a resistance change in the detector may unbalance the magnet, the first mentioned switch being opened and the second mentioned switch being closed, so as to change the current flow in the indicating portion; an excess current signal controlling relay and an undercurrent signal controlling relay in said indicating portion; a signal circuit including momentary and persisting signals, said latter circuit being normally open, separate signal circuit actuating means associated with the respective relays, whereby said momentary signal may be actuated when the first switch is opened and before the second switch becomes closed, the second mentioned signal being operative on closure of the second mentioned switch, and means for opening and closing the main circuit whereby to close the signal circuit and restore the system to normal condition.

7. An alarm system comprising a balancing control relay; an energized series circuit including a loop, an indicating circuit portion having signal means associated therewith; said relay having a winding disposed in the loop, there being a normally closed armature switch cooperating with the winding; a second relay winding in shunt to the loop; said loop having therein means for producing impedance responsive to a sound of a predetermined value, whereby when such sound occurs the varied resistance may cause the current to flow through the shunt winding and said portion so as to initiate a signal in the first mentioned means.

JOHN J. STEPHENS.